US005751830A

United States Patent [19]
Hutchinson

[11] Patent Number: 5,751,830
[45] Date of Patent: May 12, 1998

[54] METHOD AND APPARATUS FOR COHERENT IMAGING OF INFRARED ENERGY

[75] Inventor: Donald P. Hutchinson, Knoxville, Tenn.

[73] Assignee: Lockheed Martin Energy Systems, Inc., Oak Ridge, Tenn.

[21] Appl. No.: 449,715

[22] Filed: May 24, 1995

[51] Int. Cl.$^6$ .................................................. G06K 9/00
[52] U.S. Cl. ........................ 382/103; 356/28.5; 342/53
[58] Field of Search ................................ 382/191, 103, 382/106; 348/164; 356/5.09, 28.5; 342/53, 54; 250/332, 340, 341.8

[56] References Cited

U.S. PATENT DOCUMENTS

| H933 | 7/1991 | Buczek et al. ............. 356/5 |
|---|---|---|
| 4,207,002 | 6/1980 | Gara et al. .................. 356/375 |
| 4,305,666 | 12/1981 | Becherer et al. ............ 356/349 |
| 4,392,745 | 7/1983 | Wright et al. ............... 356/348 |
| 4,620,223 | 10/1986 | Haskell et al. .............. 358/107 |
| 4,696,061 | 9/1987 | Labrum ...................... 455/609 |
| 4,736,247 | 4/1988 | Graham et al. .............. 358/107 |
| 4,820,047 | 4/1989 | Snyder ........................ 356/349 |
| 4,916,536 | 4/1990 | Kerr et al. ................... 358/107 |
| 4,935,616 | 6/1990 | Scott ........................... 250/213 |
| 5,070,483 | 12/1991 | Berni .......................... 367/14 |
| 5,114,226 | 5/1992 | Goodwin et al. ............ 356/5 |
| 5,123,730 | 6/1992 | Holmes et al. .............. 356/28.5 |
| 5,142,372 | 8/1992 | Alfano et al. ................ 358/209 |
| 5,151,747 | 9/1992 | Nourrcier .................... 356/5 |
| 5,198,657 | 3/1993 | Trost et al. .................. 250/214 |
| 5,200,793 | 4/1993 | Ulich et al. ................. 356/5 |
| 5,216,259 | 6/1993 | Stern et al. .................. 250/561 |
| 5,307,073 | 4/1994 | Riza ............................ 342/372 |
| 5,353,109 | 10/1994 | Langdon et al. ............ 356/28.5 |
| 5,436,453 | 7/1995 | Chang et al. ................ 250/338.1 |
| 5,501,226 | 3/1996 | Peterson et al. ............ 128/691 |
| 5,528,051 | 6/1996 | Nuyen ......................... 257/17 |
| 5,530,711 | 6/1996 | Scheps ........................ 372/20 |
| 5,535,044 | 7/1996 | Takeshima et al. .......... 359/245 |

OTHER PUBLICATIONS

"Extended Long-Wavelength Infrared Photodetectors", by A. Zussman, et al., J. Appl. Phys. 70(9), pp. 5101-5107, 1 Nov. 1991.

"Device Physics of Quantum Well Infrared Photodetectors", by B. F. Levine, AT&T Bell Laboratories, Murray Hill, New Jersey 07974.

"Long-Wavelength 128×128 GaAs Quantum Well Infrared Photodetector Arrays", by B. F. Levine, et al., AT&T Bell Laboratories, Murray Hill, New Jersey 07974.

"Novel GaAs/AlGaAs Multiquantm-Well Schottky-Junction Device and its Photovoltaic LWIR Detection", by Chan Shin Wu, et al., IEEE Transactions on Electron Devices, vol. 39, No. 2, pp. 232-241, Feb. 1992.

"New Trends in Infrared Detector Technology", by Antoni Rogalski, Infrared Phys. Technol. vol. 35, No. 1, pp. 1-21, 1994.

(List continued on next page.)

*Primary Examiner*—Andrew W. Johns
*Attorney, Agent, or Firm*—Luedeka, Neely & Graham, P.C.

[57] ABSTRACT

A coherent camera system performs ranging, spectroscopy, and thermal imaging. Local oscillator radiation is combined with target scene radiation to enable heterodyne detection by the coherent camera's two-dimensional photodetector array. Versatility enables deployment of the system in either a passive mode (where no laser energy is actively transmitted toward the target scene) or an active mode (where a transmitting laser is used to actively illuminate the target scene). The two-dimensional photodetector array eliminates the need to mechanically scan the detector. Each element of the photodetector array produces an intermediate frequency signal that is amplified, filtered, and rectified by the coherent camera's integrated circuitry. By spectroscopic examination of the frequency components of each pixel of the detector array, a high-resolution, three-dimensional or holographic image of the target scene is produced for applications such as air pollution studies, atmospheric disturbance monitoring, and military weapons targeting.

32 Claims, 6 Drawing Sheets

OTHER PUBLICATIONS

"Quantum Cascade Laser", by Jerome Faist, et al., Science, vol. 264, pp. 553–556, 22 Apr. 1994.

"HgCdTe IR Detectors", Kolmar Technologies, Inc., Concord, MA. (No date).

"New Semiconductor Laser Developed at Bell labs", by Deborah Illman, pp. 7, 8, Apr. 25, 1994, C&EN.

"Laser–Radar Imaging Without Scanners", by Stephanie A. Weiss, News & Analysis, Photonics Spectra, pp. 28, 29, Apr. 1994.

METHOD AND APPARATUS FOR COHERENT IMAGING OF INFRARED ENERGY

This invention was made with Government support under Contract DE-AC05-84OR21400 awarded by the U.S. Department of Energy to Martin Marietta Energy Systems Inc., and the Government has certain rights to this invention.

TECHNICAL FIELD

The present invention is directed to a coherent imaging optical detector which utilizes a two-dimensional focal plane array to construct a coherent camera for heterodyne detection and processing of infrared energy to determine the amplitude, phase, and frequency distribution of the detected radiation.

BACKGROUND OF THE INVENTION

Heterodyne detection is a very sensitive method of retrieving low level signals and is employed in many remote sensing applications. A schematic diagram of a basic heterodyne receiver 100 is shown in FIG. 1. If a signal 102 amplitude, assumed to be of the form $$E_s(t) = E_{s0}(t) \cos(\omega_s t), \qquad (1)$$

where $\omega_s$ = signal frequency,
is incident on a square-law mixer 104 (a photodetector that responds to signal power) along with a locally generated signal source 108 (referred to as a local oscillator) of the form $$E_{LO}(t) = E_{LO0} \cos(\omega_{LO} t), \qquad (2)$$

where $\omega_{LO}$ = local oscillator frequency,
a voltage will appear at the output of the mixer, $$V(t) = k_1 [E_s(t) + E_{LO}(t)]^2 \qquad (3)$$

where $K_1$ = conversion factor.
Filtering out dc components and all mixing products except the difference frequency given by $\omega_{if} = \omega_s - \omega_{LO}$, the output voltage, assuming $P_s = E_s^2$ and $P_{LO} = E_{LO}^2$ is $$V_{if}(t) = k_2 \sqrt{P_s P_{LO}} \cos(\omega_{if} t), \qquad (4)$$

where $k_2$ = constant conversion factor.
This difference frequency, referred to as the intermediate frequency (IF) signal 106, is typically amplified by an amplifier 110 designed to pass a narrow band of frequencies as compared to the incident frequency around $\omega_{if}$. The output of the IF amplifier 110 is detected by a diode 112, historically referred to as a video detector. Thus, the voltage 116 impressed on the resistor 114 is $$V_R(t) = \sqrt{P_s P_{LO}} \ . \qquad (5)$$

The advantage of a heterodyne receiver may be determined by examining equations (4) and (5). The amplitude of the IF signal 104 is proportional to the product of the signal 104 amplitude and the local oscillator amplitude 106. In a typical receiver, such as a standard FM radio, the signal 102 amplitude collected by the antenna and delivered to the mixer 102 is on the order of microvolts, whereas the local oscillator level 108 may be several volts. The IF signal 106 generated by the mixing process can typically be $>10^3$ times the level available if the received signal is rectified by the video detector 112 directly. An additional benefit of this technique is the fact that only those frequencies that fall within the passband of the IF amplifier 110 are detected by the receiver 100, giving the system excellent rejection characteristics for unwanted "out-of-band" signals.

Technologies in remote optical sensing and environmental monitoring use both heterodyne (coherent) detection and incoherent detection, with no single system being capable of providing amplitude (temperature), frequency (characteristic absorption spectra), and phase (range) of a scene. Infrared focal plane arrays (FPAs), which may be used as heterodyne detectors, are found in a variety of commercial and military applications, including remote thermal imaging, target tracking, surveillance, communication, and robotic vision. FPAs use amplitude information from background IR radiation to determine pixel-level thermal information about a scene or target. For example, forward looking infrared (FLIR) systems presently in use by civilian and military organizations for night observation and spectroscopy only detect the amplitude of the infrared energy being emitted from the target scene. These systems are therefore "incoherent", using only the amplitude of a scene's blackbody radiation to map thermal distributions. Additionally, the detection element for such devices typically consists of a single element which must be mechanically scanned in order to produce a two-dimensional image. One dimensional (linear array) infrared coherent detectors have been constructed using HgCdTe photodetectors, but these devices must also be mechanically scanned to detect and map a two-dimensional image. Additionally, the mechanical scanning process causes the image to lose phase coherence due to time lags in the image mapping process.

In addition to being either coherent or incoherent, remote optical sensing can be either passive (where a local oscillator is directed onto a beamsplitter where its radiation is mixed with target scene radiation) or active (where a transmitting laser is directed at the target scene and reflected laser energy is mixed with the target scene radiation). As for the active mode, light imaging detection and ranging (LIDAR) systems employ a method of pulsing laser energy toward the target area and detecting the reflected laser energy. The laser pulse travels at a known speed (speed of light) to and from the target. Round trip time of travel is easily correlated to distance to provide ranging information. Imaging information in the form of phase and frequency of the reflected energy is also available by application of heterodyne analysis to the reflected energy using a local oscillator. Three-dimensional imaging can only be obtained by mechanically scanning the laser source. In a military environment, this type of active laser illumination of the target area could allow easy detection of friendly forces by the enemy.

As for the passive mode, there are currently no operational coherent optical detection systems which operate in the passive mode. There is one reported experimental system which uses blackbody emission observed through a cloud of pollutant gases. The system as tested has a measured range of only a few meters and uses a single detector element, not an array. There are currently no coherent optical detection systems which utilize a two-dimensional photodetector array.

SUMMARY OF THE INVENTION

Thus, there is an unfilled need for a single camera system which performs ranging, spectroscopy, and thermal imaging without the disadvantage of having to mechanically scan, and one with the versatility to operate in either the passive or active mode. The calculation of phase, frequency, and amplitude in a single "coherent" camera system would enable the detection of such phenomena as wind shear, detailed tornado motion, air disturbances caused by passing aircraft, high-resolution spectrographic images for air pollution detection and biological measurements, and improved detection for high-resolution imaging for targeting for military weapons systems. Pollution and biological applications further include mapping tree canopies for global climate studies, mapping hydrocarbons for excavation of underground storage tanks, monitoring sulfur dioxides from stack plumes, and mapping nitrogen oxide emissions. Heterodyne analysis has been applied by existing detection systems to these applications. However, existing systems must mechanically scan in order to obtain the needed phase and frequency.

Regarding the foregoing and other objects of the invention, the present invention provides a coherent imaging camera system for passively detecting and analyzing the amplitude, frequency, and phase of infrared energy being emitted from a target scene. Infrared energy being emitted by the target scene passes through an aperture having an upstream side and a downstream side, with the target scene energy entering from the upstream side and exiting from the downstream side. A local oscillator laser is used for heterodyne mixing of the target scene energy at a point downsteam from the aperture. Combining of the local oscillator and the target scene energy occurs by means of an optical beamsplitter. The optical beamsplitter directs the optically combined energies onto a two-dimensional photodetector array of a coherent imaging camera where heterodyne detection occurs and where the target scene energy forms an image of the target scene. The photodetector array comprises a plurality of photodetector elements arranged two-dimensionally, each producing an intermediate frequency signal having a voltage component and a frequency component representative of a difference between the mixed local oscillator and target scene energies. The coherent camera amplifies the voltage components and filters the frequency components of the intermediate frequency signals to produce output signals containing the amplitude, frequency, and phase of the target scene energy. Spectroscopic examination of the output signals produces three-dimensional and holographic images of the target scene. Rectification of the output signals produces a two-dimensional video display of the target scene.

In another preferred embodiment, this invention also provides a coherent imaging optical detection system for actively detecting and analyzing the amplitude, frequency, and phase of infrared energy being emitted and reflected from a target scene. In this embodiment, an aperture is provided which has an upstream side and a downstream side through which target scene infrared energy passes. The target scene energy enters the aperture from the upstream side and exits from the downstream side. A transmit laser is directed at the target scene and reflected through the aperture from the upstream side. A local oscillator laser is combined with the target scene energy and the reflected transmit laser energy by means of an optical beamsplitter. The optical beamsplitter directs the combined energies onto a two-dimensional photodetector array of a coherent camera where heterodyne detection (mixing) occurs. The photodetector array comprises a plurality of photodetector elements arranged two-dimensionally, each producing an intermediate frequency signal having a voltage component and a frequency component representative of a difference between the mixed energies. The camera amplifies the voltage components and filters the frequency components of the intermediate frequency signals to produce output signals containing the amplitude, frequency, and phase of the target scene energy. Spectroscopic examination of the output signals produces three-dimensional and holographic images of the target scene. Rectification of the output signals produces a two-dimensional video display of the target scene.

Also provided by this invention is a coherent imaging camera for heterodyne detection and processing of infrared energy emanating from a target scene and infrared energy being emitted from a local oscillator laser, producing outputs representative of the amplitude, frequency, and phase of the target scene energy. The camera comprises a photodetector array having a plurality of photodetector elements arranged two-dimensionally. By heterodyne detection of the target scene and laser energies, each photodetector element produces an intermediate frequency signal having a voltage component and a frequency component. Integrated circuit means are connected to the photodetector array for amplifying the voltage component and filtering the frequency component of the intermediate frequency signal from each photodetector element, producing an output signal from each intermediate frequency signal containing the amplitude, frequency, and phase of the target scene energy.

In another preferred embodiment, this invention provides a method for producing coherent images of a target scene radiating infrared energy. The method comprises receiving the infrared target scene radiation. A local laser beam is generated with a local oscillator infrared laser. The received target scene radiation is then combined with the local laser beam with an optical beamsplitter to produce a combination of infrared energies. A plurality of intermediate frequency signals are generated by heterodyne detection of the combination of infrared energies with a two-dimensional focal plane array having a plurality of photodetectors arranged two-dimensionally. Each photodetector produces an intermediate frequency signal which is then amplified and filtered to produce a plurality of measurable signals containing amplitude, frequency, and phase information about the target scene. Finally, the amplitude, frequency, and phase information of each measurable signal is examined by spectroscopic analysis to produce a coherent image of the target scene.

BRIEF DESCRIPTION OF THE DRAWINGS

The invention will now be described in further detail with reference to the drawings wherein like reference characters designate like or similar elements throughout the several drawings as follows.

DETAILED DESCRIPTION OF THE PREFERRED EMBODIMENT

Figure 2:
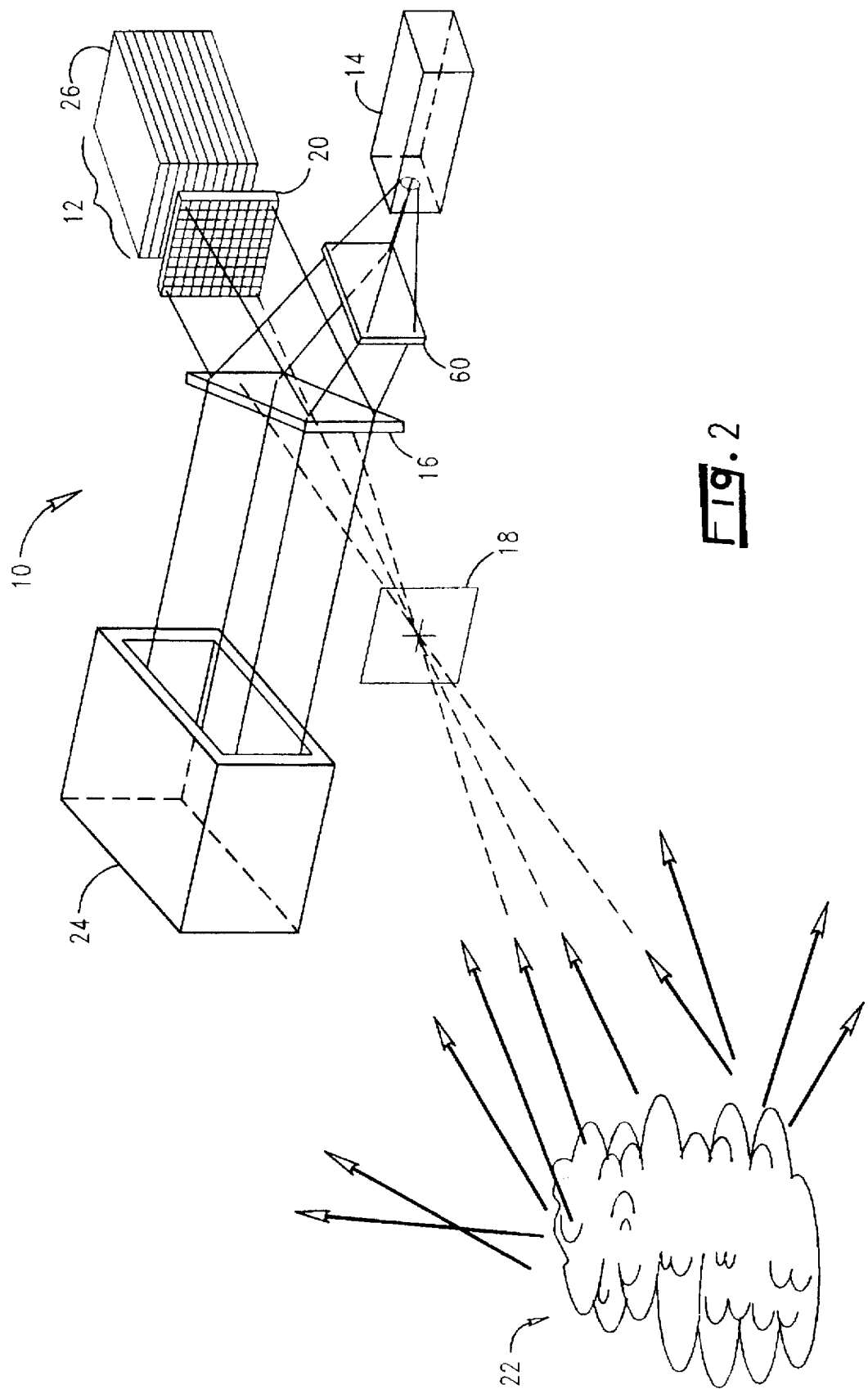
FIG. 2 is a schematic diagram of a coherent infrared imaging receiver operating in the passive mode.

In accordance with a preferred embodiment of the present invention as shown in FIG. 2, the hardware configuration for a coherent infrared imaging receiver 10 using passive mode local oscillator mixing is illustrated. The receiver 10 consists of a coherent camera 12, a local oscillator laser 14, a mask 60, a beamsplitter 16, and an aperture 18. Although the receiver 10 is capable of monitoring any target scene that emits infrared radiation, the target scene in FIG. 2 is represented by a cloud 22 radiating infrared energy in all directions at various frequencies where pollutants and other elements contained within the cloud are being monitored by the receiver 10. The configuration of FIG. 2 represents a typical application of the invention for pollution monitoring. Each of the various elements which compose the cloud 22 will radiate infrared energy at different frequencies. Some of this radiation passes through the aperture 18 and is directed through the beamsplitter 16 onto the two-dimensional focal plane array 20 of the camera 12 where it is mixed with radiation from the local oscillator laser 14 and where the target scene radiation forms an image of the target scene. Heterodyne mixing of the received radiation from the cloud 22 occurs at the focal plane array 20 by reflecting a portion of the local oscillator 14 beam off the beamsplitter 16 onto the focal plane array 20. The beamsplitter 16 is a partially transmitting element for splitting or combining optical beams and has a reflectivity of, for example, two percent. The ninety-eight percent of the beam that is not reflected passes through the beamsplitter 16 and is absorbed by a conventional beam dump 24.

Figure 1:
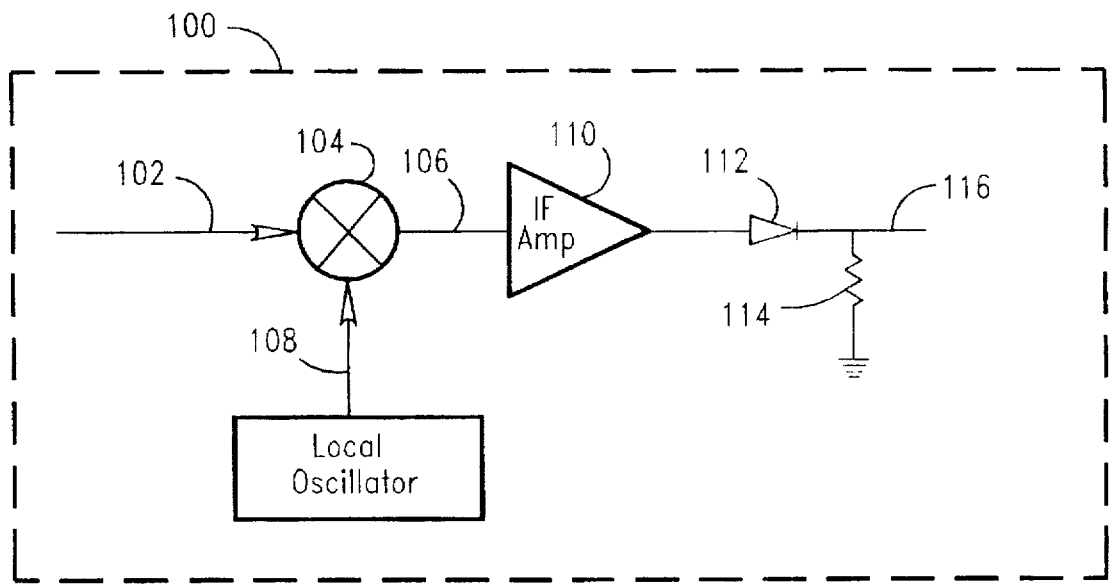
FIG. 1 is a schematic diagram of a basic heterodyne receiver.
Figure 3:
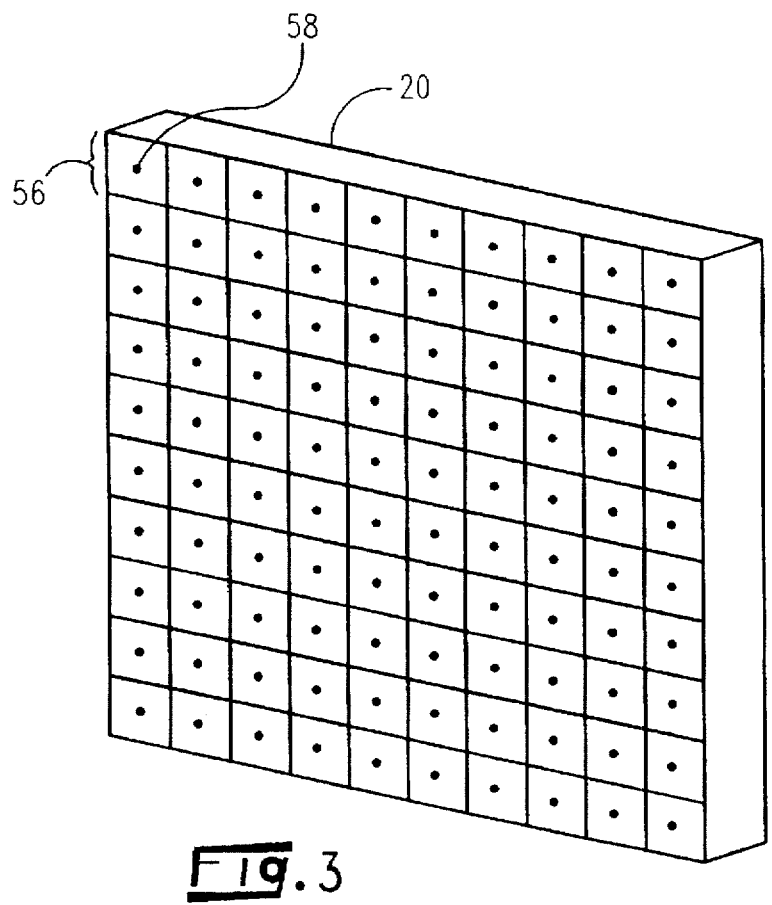
FIG. 3 is a diagram of the two-dimensional focal plane array.

The coherent camera 12 uses optical heterodyne techniques to determine the amplitude (temperature), frequency (characteristic absorption spectra), and phase (range) of the target scene 22. The camera 12 includes a focal plane array 20 and an IF receiver unit 26. FIG. 3 shows the focal plane array 20 in greater detail. Although a 10×10 array is shown, those skilled in the art will recognize that any number of array elements arranged two-dimensionally may be used, and that image resolution will improve as the number of array elements is increased. Each pixel 56 of the array 20 comprises a photodetector 58 having good mixing efficiencies, such as a HgCdTe photodetector or a quantum-well infrared photodetector. The photodetector 58 is a photosensitive material, such as GaAs or HgCdTe, which has been deposited onto a semiconductor substrate, such as Si, at the center portion of each pixel 56. Therefore, the fabrication of the array 20 is such that the entire array 20 is a single piece of semiconductor substrate partitioned into a two-dimensional arrangement of pixels 56 with a photosensitive material (photodetector 58) deposited at the center portion of each pixel 56.

Two-dimensional photodetector arrays are used in the coherent camera. Quantum well infrared photodetectors (QWIPs), which are constructed from alternating layers of GaAs and AlGaAs, have been manufactured with detection capability in the IR region from 3 to 20 microns and an individual photodetector can be configured for an optical bandwidth of 0.5 to 6 microns. QWIP arrays, operable at liquid nitrogen temperatures, are now being produced with 512×512 pixels, and a 1024×1024 array is under development. Recent advances in HgCdTe photodetectors have made possible the construction of large, sensitive, high-speed focal-plane array (FPA) photodetectors. HgCdTe photodetector arrays are now available in arrays as large as 128×128 with excellent quantum efficiencies and bandwidths greater than 200 MHz. These photodetectors have good response from 2 to 14 microns with peak responsivities around 10 microns, but they are currently being used as incoherent infrared video cameras.

Figure 4:
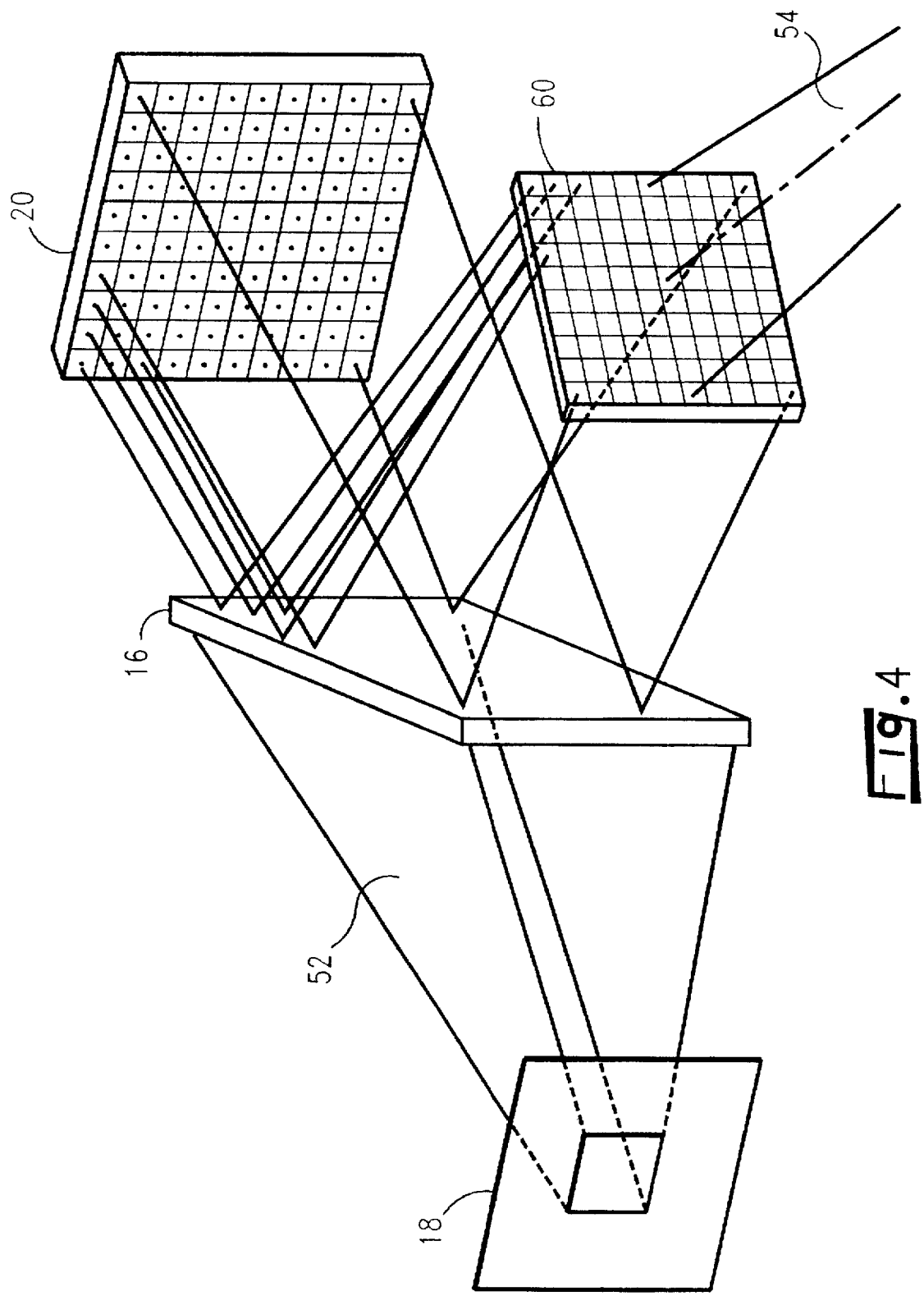
FIG. 4 is a diagram showing the local oscillator mask in operation.

Referring now to FIG. 4, heterodyne mixing of the target scene radiation 52 and the laser radiation 54 occurs at the photodetector 58 for each pixel 56 in the focal plane array 20. Although not required, it is preferred that a mask 60 be placed in the path of the laser beam 54 upstream of the beamsplitter 16 to divide the laser into 10×10 individual beams so that a portion of each individual beam reflects off the beamsplitter 16 onto an individual photodetector 58 in the array 20. In a preferred embodiment, the mask 60 may be made of silicon or other infrared transmitting material with grating etched onto it so that the grating diffracts the laser beam 54 into individual beams of laser energy. Although silicon is opaque in the visible spectrum, it is not opaque in the infrared spectrum and provides an excellent medium onto which a diffraction grating may be etched. A portion of the target scene radiation 52 mixes with one of the divided beams at each photodetector 58, thereby producing an intermediate frequency (IF) as the photodetector 58 output.

When the target scene radiation 52 is mixed with the laser radiation 54, photocurrents are generated in the photodetectors 58. In general, there will be three components contained in the induced photocurrent: two dc components proportional to the incident power of the two sources, and a cross-term containing information on the difference frequency and phase between the radiation entering the receiver aperture and the local oscillator field. This relationship is illustrated in the equation $$P_{det} = \frac{1}{2} E_1^2 + \frac{1}{2} E_2^2 + E_1 E_2 \cos(\Delta\omega t + \phi) \qquad (6)$$

where $P_{det}$=total power impinging on the detector $E_1=E_{10}(t)\cos(\omega_1 t)$=electric field amplitude of received signal $E_2=E_{20}(t)\cos(\omega_2 t)$=electric field amplitude of local oscillator signal $\Delta\omega=\omega_1-\omega_2$=difference frequency between the received signal and the local oscillator $\phi$=phase difference between the received signal and the local oscillator.

This third term in the above equation yields not only the amplitude of the received signal, but also any associated frequency shifts that fall in the passband of the receiver due to Doppler effects of a moving radiation emitter. Using this frequency and phase information, an infrared image from an object, such as a moving vehicle, aircraft, or cloud, could be used to determine not only position but precise velocity vectors associated with the object. By analyzing the frequency components of each photodetector 58 of the focal plane array 20, a high-resolution spectroscopic image can be produced. Such an image of a target like the cloud 22 in FIG. 2 could be used to study air pollution.

In an optional variation of the mask 60, the mask 60 consists of an array of apertures illuminated by a single gaussian beam. The image of the aperture array is then focused onto the focal plane array 20. The aperture array acts as a comb function which is convolved with the illuminating gaussian beam. The result of this type of optical system is an array of gaussian beams illuminating the detector array with very little side lobe overlap.

The focal plane array 20 is mounted to the IF receiver unit 26. The IF receiver unit 26 is comprised of a plurality of channels of IF processing circuitry so that there are at least as many channels in the IF receiver unit 26 as there are photodetectors 58 in the focal plane array 20. The IF output of each photodetector 58 is attached to a single channel of the IF receiver unit 26 which processes the IF output.

Figure 5:
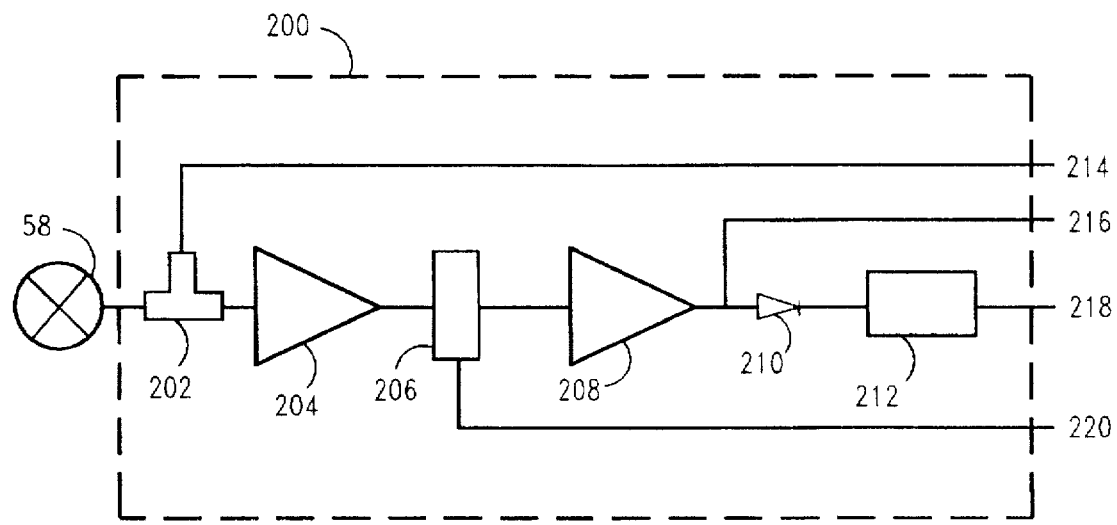
FIG. 5 is a circuit diagram of the IF strip for each channel of the camera.

FIG. 5 illustrates the circuitry for each channel 200 of the IF receiver unit 26. Although it will be understood that each channel 200 may be fabricated using individual components, the preferred embodiment uses monolithic fabrication techniques, and more particularly uses monolithic microwave integrated circuit (MMIC) fabrication technology. Small size and ease of fabrication are significant advantages to the use of such technology in the development of a coherent camera. Tremendous cost savings also result from the use of this technology. MMIC is much less expensive and consumes less weight and volume than would an IF receiver unit 26 composed of individual components. With the use of MMIC technology, the total volume of the camera 12 approximates that of a 12 oz. can.

With continued reference to FIG. 5, a low noise, wideband, pre-amplifier 204 receives the IF output from the photodetector 58. Bias tee 202 is used to control the dc mixer bias by adjusting the bias tee input 214. Pre-amplifier 204, having, for example, a gain of 30–40 db and a bandwidth greater than 200 MHz, is used as a pre-amplifier to boost the IF signal by a factor of between $10^3$ and $10^4$. The pre-amplifier 204 also serves as a 200 MHz broadband filter, filtering out all frequencies above or below its bandwidth. In a preferred embodiment, the bandwidth of the pre-amplifier 204 and the power amplifier 208 will approximate the bandwidth of the photodetector 58. For pollution monitoring applications where a broad range of pollutants are being monitored, broadband amplifiers will be desired. If a single type of pollutant is being monitored, it may be desirable to use narrow band amplifiers.

Typically, the power level of the IF signal output from the photodetector 58 will be relatively weak, usually in the microwatt range. Therefore, even with a gain of 30–40 db the IF signal will still be relatively low-power after passing preamplifier 204, so the IF signal is again amplified by a power amplifier 208. Power amplifier 208, having a gain of 30–40 db and a bandwidth of greater than 200 MHz, amplifies the IF signal so that its power level now approximates a much more measurable value. Attenuator 206, adjustable by attenuator bias signal 220, eliminates reflections that would otherwise build up between the amplifiers 204 and 208. After amplification by power amplifier 208, the IF signal, which contains the desired spectroscopic information, is then output as a measurable broadband output 216 and used to identify elements of the target scene that are radiating at frequencies within the 200 MHz bandwidth of the amplifiers 204 and 208. Methods for distilling the frequency information from the broadband output 216 will vary depending on the application. For example, to determine the absorption spectrum of a target gas cloud emerging from a smokestack, a simple Fourier transform may be used to isolate the power and frequency components. If a lower resolution frequency analysis of the detected radiation is desired, a filter bank may be used to isolate the frequency components. Such spectroscopic examination of the broadband output 216 enables creation of three-dimensional and holographic images of the target scene, thereby providing a convenient way to analyze and monitor the target scene. To provide a video output signal 218, the IF signal is rectified by an RF detector diode 210 and then routed through a low pass filter 212 having a bandwidth of 5 MHz. The resulting low-frequency, video output signal 218 provides an infrared image of elements that are radiating within the 200 MHz bandwidth.

Figure 6:
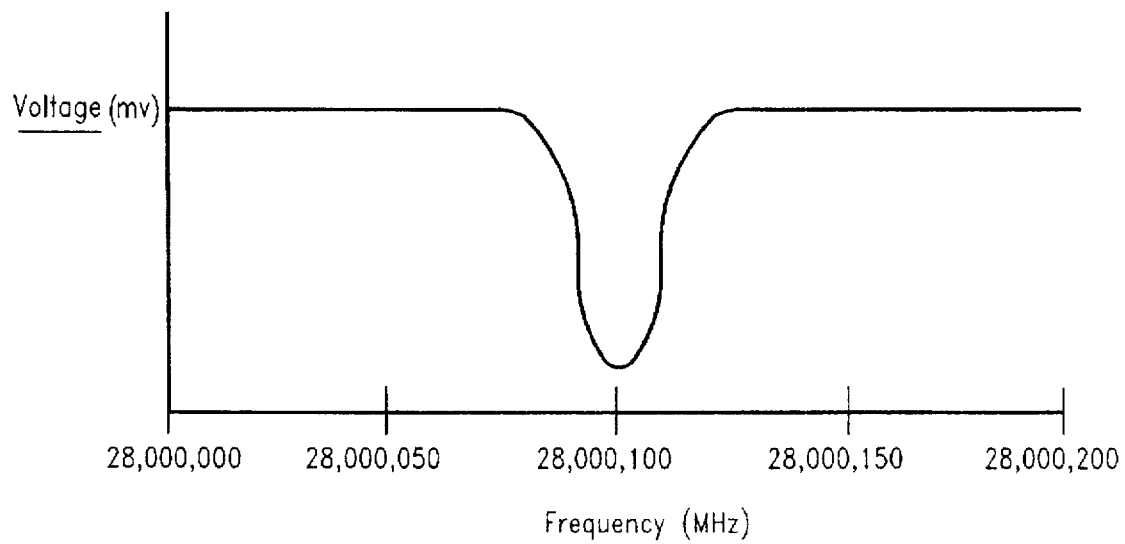
FIG. 6 is a graph showing a typical spectroscopic response to the presence of an element during passive mode reception.

With continued reference to FIG. 5, the broadband output 216 is used to determine the amplitude (temperature), frequency (characteristic absorption spectra), and phase (range) of elements within the target scene. Spectroscopic information is obtained by observing the amplitude (voltage) versus the frequency of the IF signal across the 200 MHz bandwidth, with any background radiation being set to a constant amplitude. For example, suppose that the receiver 10 of FIG. 2 is positioned to receive background radiation from a mountain with the local oscillator laser 14 being a $CO_2$ laser with its frequency line tuned to 28,000,000 MHz. Suppose further that the cloud 22 contains sulfur pollutants which absorb radiation at a known frequency of 28,000,100 MHz. As the cloud 22 drifts into view of the receiver 10 so that the cloud 22 is now between the receiver 10 and the mountain, the sulfur molecules in the cloud 22 will absorb some of the background radiation. Since sulfur will absorb radiation at a frequency within 200 MHz of the laser frequency, it is contained within our broadband output 216 and will appear as a voltage drop at a frequency of 28,000, 100 MHz as shown in FIG. 6. By comparing the absorption frequency observed in FIG. 6 to known absorption characteristics of the various elements, a determination can be made as to the presence of sulfur in the cloud 22. If, however, the laser frequency line was set to a frequency of 27,000,000 MHz, then sulfur would not appear in the broadband output 216.

One method of ensuring that the frequency line of the laser 14 is sufficiently close to the target scene radiation is to select a local oscillator laser 14 that operates at a frequency within the 200 MHz amplifier passband of the elements that are expected to appear within the target scene. This method is very effective when the user is looking for a particular element in the target scene. Another solution is to employ a laser, such a $CO_2$ laser, that is frequency line tunable over a large portion of the spectrum. Measurements of the target scene can then be easily taken over a broad portion of the spectrum as the laser is swept through its range of frequency lines.

The presence of particular elements in the cloud 22 of FIG. 2 may be observed with equal effectiveness by looking for an emission peak in the graph of FIG. 6 instead of an absorption dip. An emission peak may be best observed when the receiver 10 is positioned to receive low-level background radiation, such as the sky. As the cloud 22 drifts into view of the receiver 10, radiating elements within the cloud 22 will provide a voltage peak on the graph of FIG. 6 in relation to the amplitude of the background radiation of the sky. By comparing the emission peaks observed to known emission characteristics of the various elements, a determination can be made as to the presence of various elements within the cloud 22.

The passive mode configuration of FIG. 2 is best suited for applications where the user is looking for certain temperature information. If, however, the user is less interested in temperature information and more interested in tracking moving objects within the target scene, then the active mode receiver system 200 shown in FIG. 7 will provide the better suited configuration.

Figure 7:
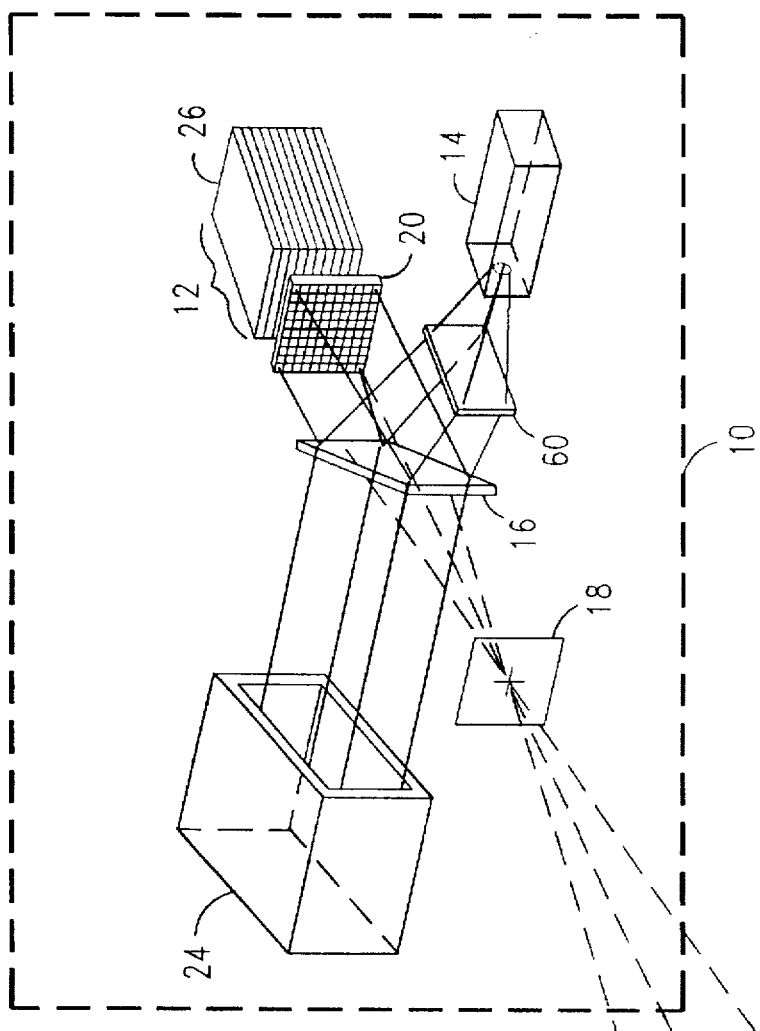
FIG. 7 is a schematic diagram of a coherent infrared imaging receiver operating in the active mode.
Figure 7:
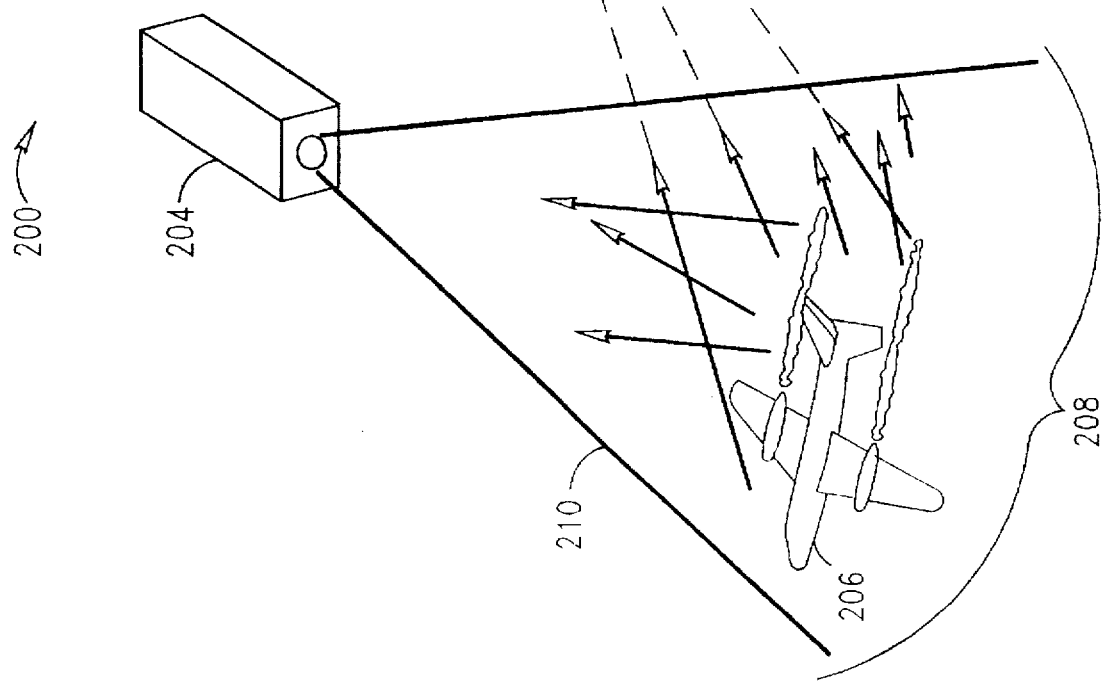

In FIG. 7, a coherent infrared imaging receiver 10 operating in the active mode is illustrated. The system 200 consists of a receiver 10 identical to the one discussed for the passive configuration of FIG. 2, and a transmitting laser 204.

Although the system 200, as illustrated, is being used to monitor the movement of an aircraft 206 through the target scene 208, it will be understood to those skilled in the art that the system 200 is capable of monitoring any target scene. Other applications of the active mode system 200 include studying phenomena such as wind flow in an urban area around buildings, the wake left by a ship or a submarine at sea, air pollution, and military weapons targeting.

The system 200 operates in the active mode in that the transmitting laser radiation 210 is directed toward the target scene 208 where the target scene 208 includes the entire three-dimensional area illuminated by the laser radiation 210. Laser radiation 210 is reflected off the aircraft 206 in all directions. Some of this radiation passes through the aperture 18, along with some of the natural infrared radiation 15 being emitted by the aircraft 206 and its exhaust plumes. The natural radiation and the reflected laser radiation pass through the beamsplitter 16 and impinge on the two-dimensional focal plane array 20 of the camera 12 where heterodyne detection occurs as previously discussed for the passive mode configuration of FIG. 2. The transmitting laser 204 produces a higher power laser beam than does the local oscillator laser 14 of the receiver 10. The transmitting laser 204 can be frequency tunable so that during operation, the two lasers 14 and 204 (both of which are frequency tunable) can remain phase-locked so as to maintain a frequency difference between them. The camera 12 produces, amplifies, filters, and rectifies intermediate frequency signals produced by each pixel of the focal plane array 20 as previously discussed. Therefore, the versatility of the receiver 10 enables it to be used in either passive or active mode configurations.

Figure 8:
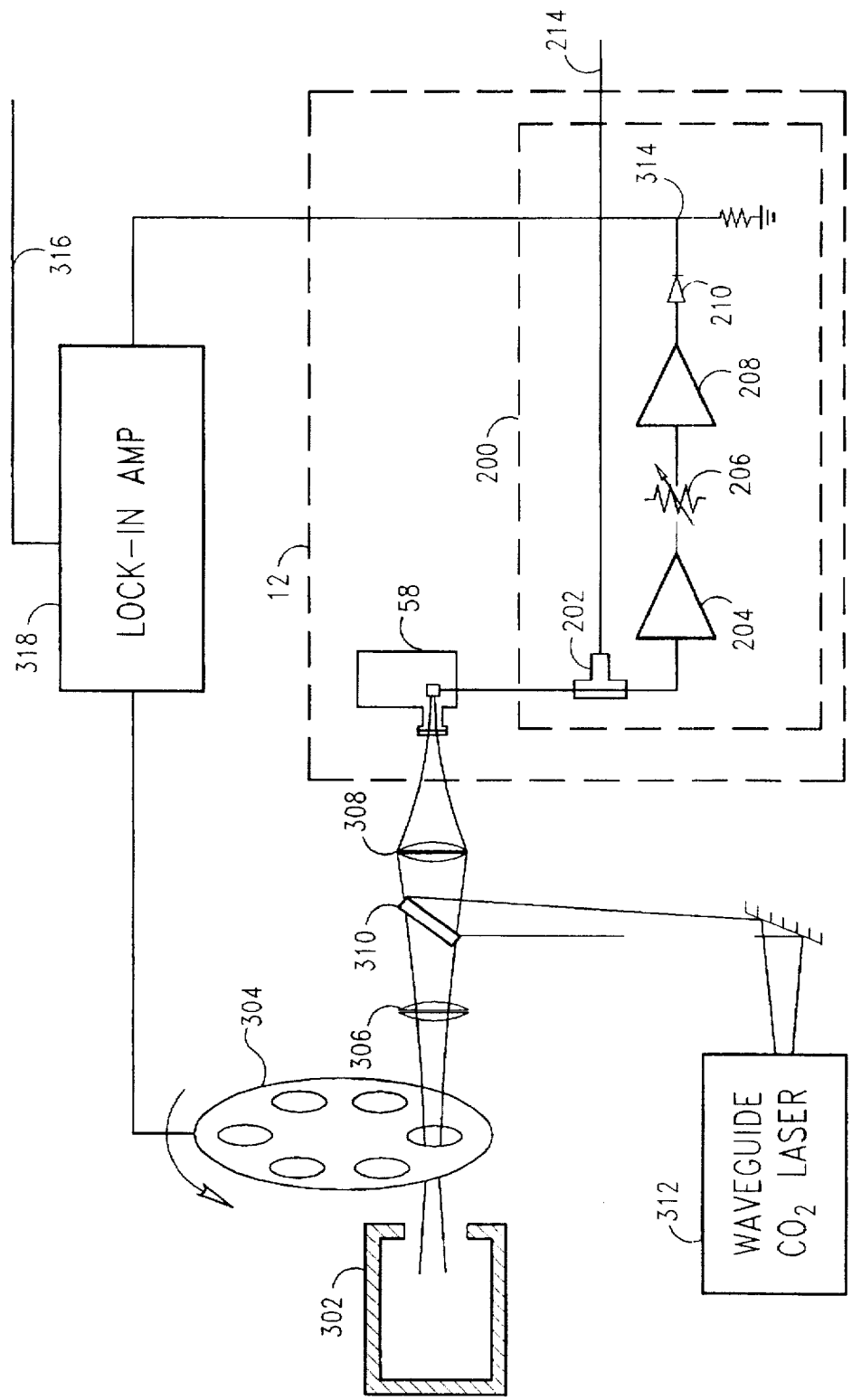
FIG. 8 is a schematic diagram showing system setup during receiver calibration using a blackbody source.

To calibrate the receiver 10 a blackbody source 302 is used in a calibration setup as shown in FIG. 8. (For clarity, the calibration of only one photodetector 58 of the focal plane array 20 is shown.) The camera 12 of FIGS. 2 and 7 is positioned so that infrared energy radiating from the blackbody 302, which is maintained at a known temperature, passes through a chopper 304 and is focused onto a photodetector 58 of the focal plane array 20 by a set of optical lenses 306 and 308. The chopper 304 may be any device which alternately prevents and allows radiation from the blackbody 302 to reach the photodetector 58, but it is typically a wheel having a number of circular cutouts which alternately allow and prevent passage of the blackbody 302 radiation as the wheel is turned. The chopper 304 is maintained at a known temperature different than that maintained by the blackbody 302 so that as the chopper 304 turns, a known alternation of infrared amplitude and frequency is focused onto the photodetector 58, thereby producing an alternating component in the IF signal.

With continued reference to FIG. 8, energy provided by a waveguide $CO_2$ laser 312 is combined by means of a beamsplitter 310 with the energy being alternately provided by the blackbody/chopper configuration so that heterodyne detection occurs at the photodetector 58. The resultant IF signal contains two components: an ac component representative of the alternating chopper energy received, and a dc component representative of noise in the system. Typically, the dc noise signal will have a much greater magnitude than the ac signal. The IF signal, with its dc and ac components, is amplified and rectified by the IF receiver channel 200 to produce a measurable dc voltage 314 representative of the system noise. To extract the ac component, a lock-in amplifier 318 is used to isolate the ac component and then amplifies it to a measurable level. The lock-in amp 318 knows the frequency of the chopper 304 and looks for an oscillation in the IF signal that has the same frequency. Once the lock-in amp 318 finds a matching oscillation, the oscillation is amplified to produce an ac voltage signal 316. The isolated ac and dc components are compared and the bias tee 202 is adjusted by dc bias signal 214 to optimize the system's signal (ac component) to noise (dc component) ratio. This process is repeated for each photodetector 58 in the focal plane array 20. Very good photodetectors 58 with high quantum efficiencies will often provide a strong enough ac component to preclude the need for a lock-in amp 318.

Although the preferred embodiment of this invention operates in the infrared portion of the frequency spectrum, it will be understood by those skilled in the art that applications exist for use of the invention in the near infrared portion of the spectrum.

It is contemplated, and will be apparent to those skilled in the art from the preceding description and accompanying drawings that modifications and/or changes may be made in the embodiments of the invention. Accordingly, it is expressly intended that the foregoing description and accompanying drawings are illustrative of preferred embodiments only, not limiting thereto, and that the true spirit and scope of the present invention be determined by reference to the appended claims.

What is claimed is:

1. A coherent imaging optical detection system for passively detecting and analyzing the amplitude, frequency, and phase of naturally-occurring target scene infrared energy being emitted from a target scene, the system comprising:

an aperture having an upstream side and a downstream side through which said naturally-occurring target scene infrared energy passes, said target scene infrared energy entering the aperture from the upstream side and exiting the aperture from the downstream side;

a local oscillator laser for generating a local beam of infrared laser energy for heterodyne mixing with the target scene infrared energy, said local beam of infrared laser energy being directed only onto an area downstream from where the target scene infrared energy enters said aperture;

an optical beamsplitter for receiving said target scene infrared energy and said local beam of infrared laser energy, combining said infrared energies, and producing a combination of said infrared energies; and a coherent imaging camera having a two-dimensional photodetector array for receiving the combination of infrared energies for heterodyne detection of said energies, the target scene infrared energy producing an image on said photodetector array, said photodetector array comprising a plurality of photodetector elements arranged two-dimensionally each producing an intermediate frequency signal having a voltage component and a frequency component representative of a difference between the two infrared energies, said camera amplifying the voltage components and filtering the frequency components of the intermediate frequency signals to produce output signals containing the amplitude, frequency, and phase of said target scene infrared energy.

2. A coherent imaging optical detection system as described in claim 1 wherein said laser beam is directed only onto the beamsplitter which reflects at least a portion of the laser beam onto the photodetector array.

3. A coherent imaging optical detection system as described in claim 1 wherein said local oscillator laser is frequency tunable to a plurality of frequency lines.

4. A coherent imaging optical detection system as described in claim 1, further comprising an optical mask having a plurality of apertures and being located between the laser and the beamsplitter for dividing the laser beam into a plurality of divided beams so that at least a portion of each divided beam is reflected off the beamsplitter onto a photodetector element for heterodyne mixing with at least a portion of the target scene infrared energy.

5. A coherent imaging optical detection system as described in claim 1 wherein said coherent imaging camera further comprises monolithic microwave integrated circuit means providing a plurality of intermediate frequency signal processing channels.

6. A coherent imaging optical detection system as described in claim 1 wherein said photodetector elements further comprise mercury-cadmium-telluride photodetectors.

7. A coherent imaging optical detection system as described in claim 1 wherein said photodetector elements further comprise quantum-well photodetectors.

8. A coherent imaging optical detection system as described in claim 1 wherein said camera rectifies the output signals to produce video signals for two-dimensional display of the target scene.

9. A coherent imaging optical detection system for actively detecting and analyzing the amplitude, frequency, and phase of infrared energy being emitted and reflected from a target scene, comprising:

an aperture having an upstream side and a downstream side through which the target scene infrared energy passes, said target scene infrared energy entering the aperture from the upstream side and exiting the aperture from the downstream side;

a transmit laser for generating a transmit beam of infrared laser energy, said transmit beam being directed onto the target scene and reflected through said aperture from the upstream side to produce reflected infrared laser energy for heterodyne mixing with the target scene infrared energy;

a local oscillator laser for generating a local beam of infrared laser energy that is directed onto an area downstream from where the target scene infrared energy and the reflected infrared laser energy enters the aperture for heterodyne mixing with the target scene infrared energy and the reflected infrared laser energy;

an optical mask having a plurality of apertures for dividing the local beam into a plurality of divided beams;

an optical beamsplitter for receiving said target scene infrared energy, said reflected infrared laser energy, and said plurality of divided beams, combining said infrared energies, and producing a combination of said infrared energies; and a coherent imaging camera having a two-dimensional photodetector array for receiving the combination of infrared energies for heterodyne detection of said energies, the target scene infrared energy producing an image on said photodetector array, said photodetector array comprising a plurality of photodetector elements arranged two-dimensionally each producing an intermediate frequency signal having a voltage component and a frequency component representative of a difference between the mixed infrared energies, said camera amplifying the voltage components and filtering the frequency components of the intermediate frequency signals to produce output signals containing the amplitude, frequency, and phase of said target scene infrared energy.

10. A coherent imaging optical detection system as described in claim 9 wherein said local oscillator and transmit lasers are frequency tunable to a plurality of frequency lines.

11. A coherent imaging optical detection system as described in claim 9 wherein said local oscillator and transmit lasers are phase-locked.

12. A coherent imaging optical detection system as described in claim 9 wherein said camera rectifies the output signals to produce video signals for two-dimensional display of the target scene.

13. A coherent imaging optical detection system as described in claim 9 wherein said coherent imaging camera further comprises monolithic microwave integrated circuit means providing a plurality of intermediate frequency signal processing channels.

14. A coherent imaging optical detection system as described in claim 9 wherein said two-dimensional photodetector array further comprises a plurality of mercury-cadmium-telluride photodectors.

15. A coherent imaging optical detection system as described in claim 9 wherein said two-dimensional photodetector array further comprises a plurality of quantum-well photodetectors.

16. A coherent imaging camera for heterodyne detection and processing of naturally-occurring infrared energy emanating from a target scene and infrared energy being emitted from a local oscillator laser to produce outputs representative of the amplitude, frequency, and phase of said naturally-occurring target scene infrared energy, said camera comprising:

a photodetector array having a plurality of photodetector elements arranged two-dimensionally for heterodyne detection of said naturally-occurring target scene infrared energy and said laser energy wherein each photodetector element produces an intermediate frequency signal having a voltage component and a frequency component; and integrated circuit means connected to said photodetector array for amplifying the voltage component and filtering the frequency component of the intermediate frequency signal from each photodetector element to produce an output signal from each intermediate frequency signal containing the amplitude, frequency, and phase of said target scene infrared energy.

17. A coherent imaging optical detection system as described in claim 16 wherein said local oscillator laser is frequency tunable to a plurality of frequency lines.

18. A coherent imaging camera as described in claim 16 wherein said integrated circuit means comprises a plurality of integrated circuit channels wherein each channel is connected to a single photodetector element.

19. A coherent imaging camera as described in claim 16 wherein said integrated circuit means comprises integrated circuitry fabricated with monolithic microwave integrated circuits.

20. A coherent imaging camera as described in claim 16 wherein said camera rectifies the output signals to produce video signals for two-dimensional display of the target scene.

21. A coherent imaging camera as described in claim 16 wherein said photodetector elements further comprise mercury-cadmium-telluride photodetectors.

22. A coherent imaging camera as described in claim 16 wherein said photodetector elements further comprise quantum-well photodetectors.

23. A method for producing coherent images of a target scene radiating infrared energy, comprising the steps of:

receiving naturally-occurring infrared target scene radiation radiating from the target scene;

generating a local laser beam with a local oscillator infrared laser;

combining the naturally-occurring target scene radiation and the local laser beam with an optical beamsplitter to produce a combination of infrared energy;

generating a plurality of intermediate frequency signals by heterodyne detection of the combination of infrared energy with a two-dimensional focal plane array having a plurality of photodetectors arranged two-dimensionally, wherein each photodetector produces an intermediate frequency signal;

amplifying and frequency filtering each intermediate frequency signal to produce a plurality of measurable signals containing amplitude, frequency, and phase information about the target scene; and examining the amplitude, frequency, and phase information of each measurable signal by spectroscopic analysis to produce an image of the target scene.

24. A method for producing coherent images as described in claim 23 wherein said combining step further comprises dividing the local laser beam into a plurality of divided beams arranged two-dimensionally, each divided beam combining with a portion of the target scene radiation for heterodyne detection by one of the photodetectors.

25. A method for producing coherent images as described in claim 23, further comprising the step of rectifying each measurable signal to produce video signals for displaying an infrared image of the target scene.

26. A method for producing coherent images as described in claim 23 wherein said generating step further comprises a local oscillator infrared laser having a plurality of frequency lines.

27. A method for producing coherent images as described in claim 23, further comprising the steps of:

generating a transmit laser beam with a transmit laser; and directing the transmit laser beam at the target scene to reflect a portion of the transmit laser beam back to the beamsplitter where it is combined with the target scene radiation and the local laser beam to produce the mixture of infrared energy.

28. A method for producing coherent images as described in claim 27 wherein the step of generating a transmit laser beam further comprises generating a transmit laser beam with a transmit laser that is phase-locked with the local oscillator infrared laser.

29. A method for producing coherent images as described in claim 27 wherein the local oscillator and transmit lasers have a plurality of frequency lines, said lasers being phase-locked, and further comprising the step of sweeping the phase-locked local oscillator and transmit lasers through said plurality of frequency lines.

30. An infrared imaging system for determining optical properties of naturally-occurring infrared energy emitted from a target scene, the system comprising:

an aperture through which naturally-occurring target scene infrared energy passes;

a reference energy source for producing reference infrared energy;

an optical beamsplitter for receiving said naturally-occurring target scene infrared energy and said reference infrared energy, combining said infrared energies, and producing a combination of said infrared energies; and a coherent imaging camera having a two-dimensional photodetector array for receiving the combination of infrared energies for heterodyne detection of said energies, said photodetector array comprising a plurality of photodetector elements arranged two-dimensionally each producing an intermediate frequency signal representative of a difference between the two infrared energies.

31. The system of claim 30 wherein said camera further comprises integrated circuit means for processing intermediate frequency signals produced by said array.

32. The system of claim 30 wherein said reference infrared energy is directed onto the target scene and reflected from the target scene through said aperture prior to mixing with target scene infrared energy at said beamsplitter.

* * * * *